United States Patent

Legallais et al.

[11] Patent Number: 6,102,077
[45] Date of Patent: Aug. 15, 2000

[54] MULTIPLE-TUBE FLEXIBLE PIPE HAVING HIGH COMPRESSIVE STRENGTH

[75] Inventors: Lucien Legallais, Orgeval; Eric Binet, Mont Saint Aignan, both of France

[73] Assignee: Coflexip, France

[21] Appl. No.: 09/077,236

[22] PCT Filed: Nov. 21, 1996

[86] PCT No.: PCT/FR96/01848

§ 371 Date: May 26, 1998

§ 102(e) Date: May 26, 1998

[87] PCT Pub. No.: WO97/20162

PCT Pub. Date: Jun. 5, 1997

[30] Foreign Application Priority Data

Nov. 24, 1995 [FR] France .................................. 95 13974

[51] Int. Cl.[7] ................................ F16L 11/00; F16L 9/14
[52] U.S. Cl. ............................................. 138/115; 138/148
[58] Field of Search ..................................... 405/168, 154; 166/0.5; 57/294; 264/255; 138/115, 121, 111–114, 148, 149

[56] References Cited

U.S. PATENT DOCUMENTS

| | | | |
|---|---|---|---|
| 3,526,086 | 9/1970 | Morgan | 138/111 |
| 3,872,893 | 3/1975 | Roberts | 138/121 |
| 4,098,333 | 7/1978 | Wells et al. | 166/0.5 |
| 4,162,865 | 7/1979 | Aubet | 405/154 |
| 4,332,509 | 6/1982 | Reynard et al. | 405/168 |
| 4,974,408 | 12/1990 | Karhu | 57/294 |
| 5,202,076 | 4/1993 | Carlstrom | 264/255 |
| 5,362,921 | 11/1994 | Birkelund et al. | 138/111 |

*Primary Examiner*—Andres Kashnikov
*Assistant Examiner*—Davis Hwu
*Attorney, Agent, or Firm*—Ostrolenk, Faber, Gerb & Soffen, LLP

[57] ABSTRACT

A multiple-tube flexible pipe (1) including a central flexible member (2) having high tensile and compressive strength, a casing (8) and a plurality of circumferentially arranged tubes (3) wound around the central flexible member to form at least one ply in a ring-shaped space between said central flexible member (2) and said casing (8). At least one of said circumferentially arranged tubes (3) has low compressive and/or tensile strength. The flexible pipe further comprises at least one flexible compressive force transmitting member (5) arranged in said ring-shaped space and adjacent to said tube (3, 4) having low compressive and/or tensile strength.

26 Claims, 8 Drawing Sheets

FIG_3

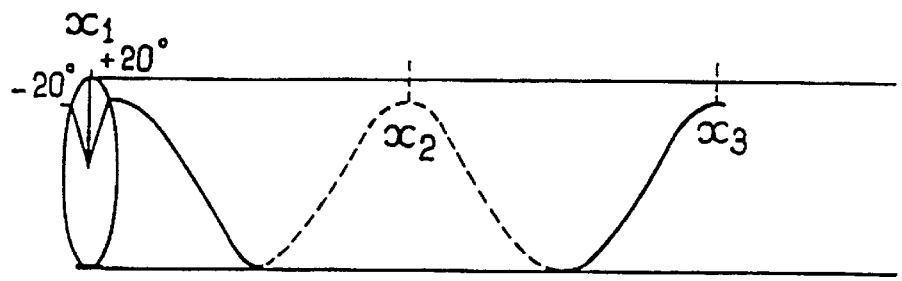
FIG_6
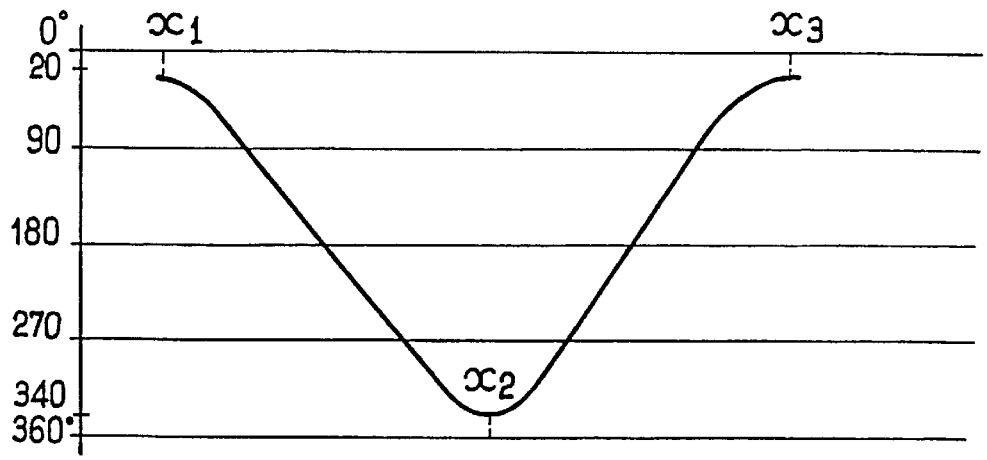
FIG_7
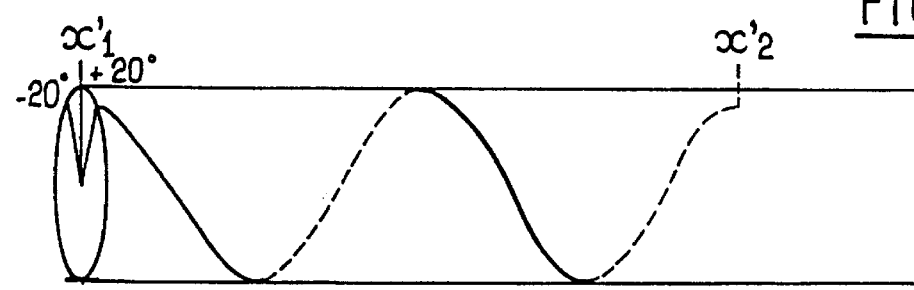
FIG_8
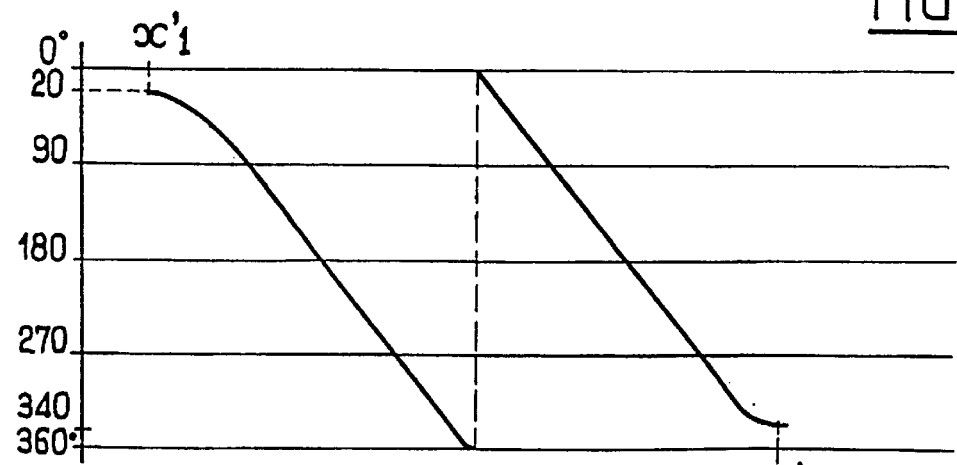
FIG_9

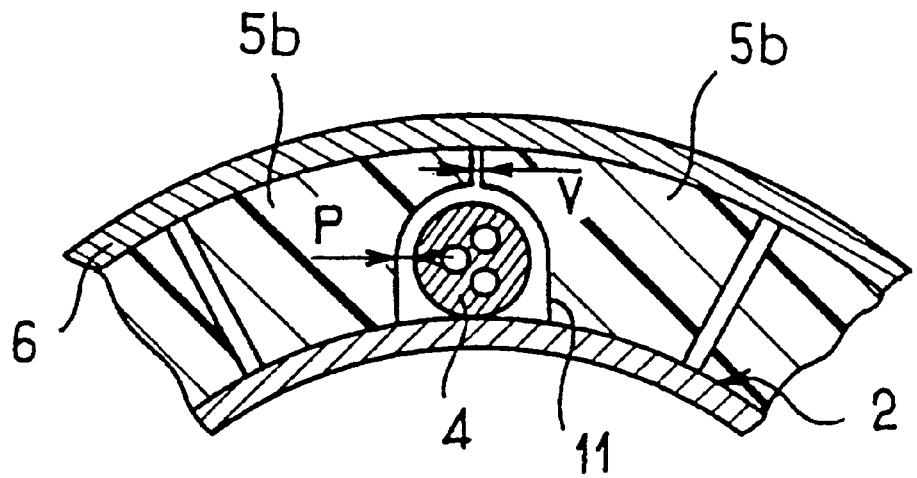
FIG_10
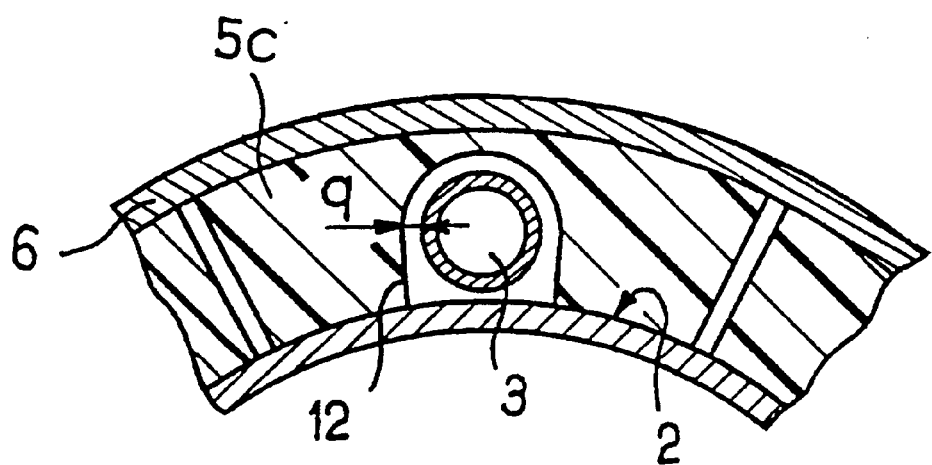
FIG_11

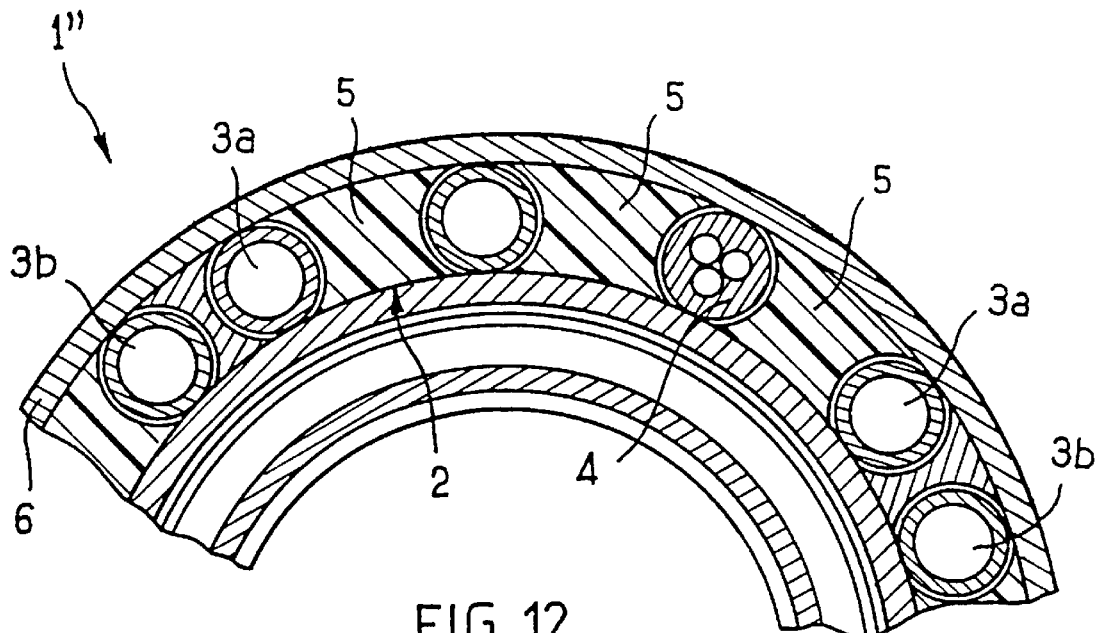
FIG_12
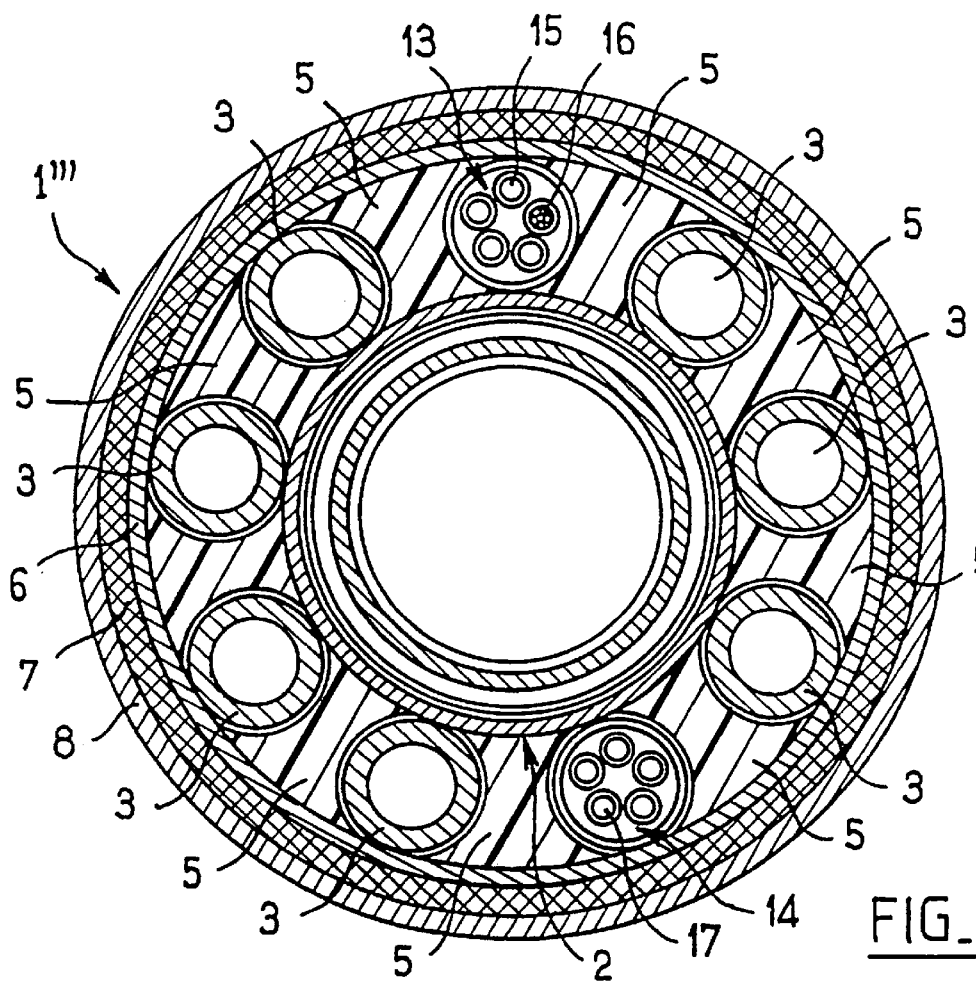
FIG_13

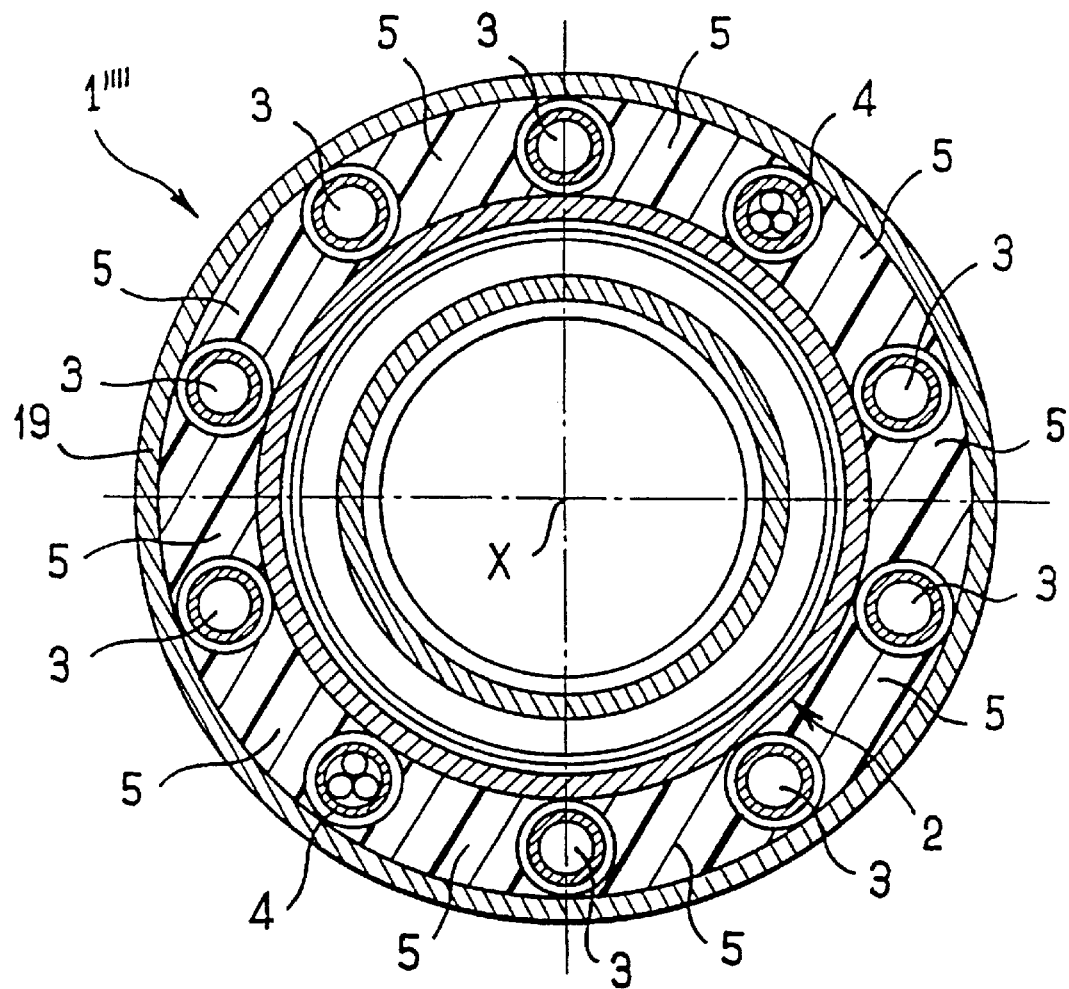
FIG_14
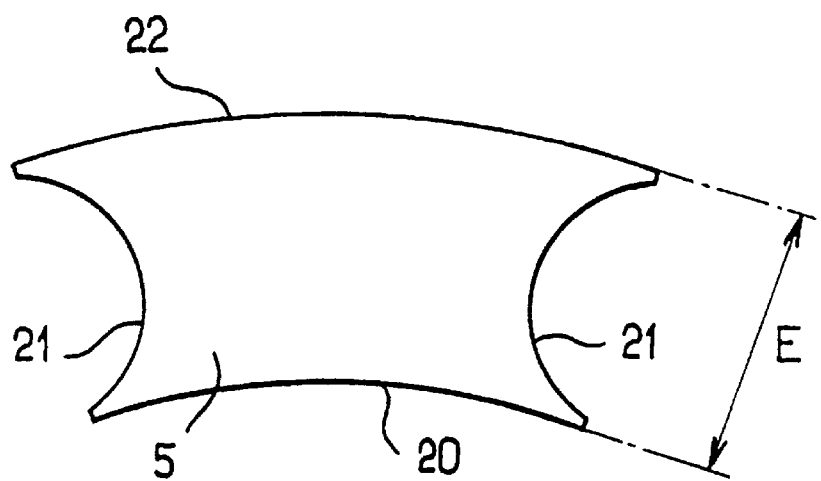
FIG_15

MULTIPLE-TUBE FLEXIBLE PIPE HAVING HIGH COMPRESSIVE STRENGTH

BACKGROUND OF THE INVENTION

The present invention relates to a flexible pipeline intended to connect, for example, a subsea oil well head to a subsea or floating oil production facility.

A subsea oil well head is usually connected to a subsea or floating oil production facility via several pipelines, including:

- a production line consisting of a flexible pipe intended for conveying the liquid hydrocarbons;
- a service line consisting of one or more flexible pipes, which is intended for conveying gaseous hydrocarbons, on degassing, or compressed gas for forcing up liquid hydrocarbons;
- a control umbilical comprising one or more compression-sensitive hydraulic pipes and/or electrical and/or optical cables for power and/or information transmission.

The flexible pipes used for serving production and service lines have a high mechanical strength, in particular a high resistance to internal pressure, a high tensile strength and a high compressive resistance, and are usually laid by means of tensioning devices comprising caterpillar tracks provided with pads which grip the pipe and move translationally over a given path in order to jointly entrain it.

The tensile loads applied by these caterpillar-track tensioning devices to a flexible pipe may be considerable when laying at great depth, and the compressive forces exerted by the pads on the pipe must be high enough to avoid any relative slippage between the pads and the pipe.

The control umbilicals have a lower resistance to compressive loads than the flexible pipes serving as production or service lines, because of the presence of compression-sensitive pipes, and they cannot be laid by means of caterpillar-track tensioning devices.

The umbilicals are generally laid using winches, the tensile loads being transferred by at least one metal armouring layer located in the pipe's outer jacket.

Moreover, the electrical and/or optical cables present in the umbilicals have a low tensile strength.

Now, the tensile stresses to which the various layers of a cable bundle under bending may be subjected increase as one goes further away from the central axis (or neutral fiber).

It is therefore preferred to place the electrical and/or optical cables of a control umbilical as close as possible to the central axis. If the control umbilical has a central pipe, the latter cannot exceed a certain diameter in order to avoid subjecting the electrical and/or optical cables wound around the latter to excessively high stresses liable to break them.

In practice, the external diameter of umbilicals therefore does not exceed 200 mm.

The current trend is to increase the number of subsea well heads connected to a single production facility.

The Applicant proposed, at the Offshore Technology Conference in Houston, Tex., in 1987, simplifying the operations of laying and handling the production and service lines and control umbilicals by combining them into multipipe pipelines which are more compact and easier to handle and lay.

However, these multipipe pipelines must:

- withstand the very high tensile loads in the case of laying at great depth;
- withstand the compressive loads generated by contact with a curved support or when they pass between the pads of a caterpillar-track laying or handling device; and
- have sufficient flexibility to withstand the combined flexural and tensile mechanical stresses due to swell.

The pipelines as described in the aforementioned conference, which comprise compression-sensitive peripheral pipes, are incapable of withstanding the passage through caterpillar-track tensioning devices.

DE-A-1 918 575 relates to a multi-tube flexible pipe, but not comprising a flexible compressive-load-transferring member arranged in an annular space provided in said multiple-tube flexible pipe.

The subjet of the present invention is a novel multipipe flexible pipeline making it possible to simplify the laying and handling operations, of the type comprising a central flexible element with a high tensile strength and a high compressive strength and a plurality of peripheral pipes wound around the said central flexible element in at least one ply in an annular space lying between the said central flexible element and a jacket, at least one of the said peripheral pipes being a compression- and/or tension-sensitive pipe.

The central flexible element is typically a flexible tubular pipe of the type used for serving production lines and is manufactured in long lengths by the Applicant.

As a variant, the central flexible element comprises an assembly of several flexible tubular pipes or consists of a cable.

According to the invention, the multipipe pipeline comprises at least one flexible compressive-load-transferring member adjacent to the said at least one compression- and/or tension-sensitive peripheral pipe and arranged in the annular space lying between the said central flexible element and the said jacket.

The invention makes it possible to reconcile in a single multipipe pipeline, on the one hand, a production and/or service line and/or a cable and, on the other hand, a control umbilical.

This pipeline can be installed by means of a laying device of the type normally used for laying high-strength flexible pipes such as those serving as production or service lines, in particular a caterpillar-track tensioning device.

According to one particularly advantageous characteristic of the invention, the multipipe pipeline furthermore includes sliding means capable of allowing the said compression- and/or tension-sensitive pipe and the adjacent flexible compressive-load-transferring member to undergo relative axial movement.

The term "pipe" means here, in a general manner, both a liquid or gas pipe and a power or optical cable.

In practice, it is the power or optical cables which have the lowest tensile strength and the tensile-strength problem is consequently the most critical for these, it being possible for an excessive tensile force to break a cable.

In one embodiment of the invention, the said sliding means include a gap left between the said at least one compression- and/or tension-sensitive peripheral pipe and the said adjacent flexible compressive-load-transferring member.

Preferably, this gap j satisfies the relationship:

$0.03d \leq j \leq 0.2d$, and preferably the relationship:

$0.1d \leq j \leq 0.15d$, where d denotes the external diameter of the compression- and/or tension-sensitive peripheral pipe.

In one embodiment of the invention, the pipeline satisfies the relationship $2E \geq c \geq 0.6E$ and preferably the relationship $1.6E \geq c \geq 0.8E$, where c denotes the width of the said compressive-load-transferring member, measured at mid-thickness of the said annular space and E denotes the thickness of the said annular space.

In one embodiment of the invention, the pipeline comprises at least two adjacent compression- and/or tension-sensitive peripheral pipes and it includes a compressive-load-transferring member between the said two adjacent peripheral pipes, the width c of which satisfies the relationship $c \geq 0.6E$ and preferably the relationship $c \geq 0.8E$, where E denotes the thickness of the said annular space, the width c being measured at mid-thickness of the annular space.

Other characteristics and advantages of the present invention will emerge from reading the following detailed description of non-limiting illustrative embodiments of the invention and from examining the appended drawing in which:

BRIEF DESCRIPTION OF THE DRAWINGS

FIGS. 6 to 9 illustrate various configurations of the winding in sections of helices of the "S-Z" type;

FIG. 10 is a partial view, in cross-section, showing a detail of the construction of a flexible pipeline according to a third illustrative embodiment of the invention;

FIG. 11 is a similar view to FIG. 10 showing a detail of the construction of a flexible pipeline according to a fourth illustrative embodiment of the invention;

FIG. 12 is a partial view, in cross-section, of a flexible pipeline according to a fifth illustrative embodiment of the invention;

FIG. 13 is a cross-sectional view of a flexible pipeline according to a sixth illustrative embodiment of the invention;

FIG. 14 is a cross-sectional view of a flexible pipeline according to a seventh illustrative embodiment of the invention; and FIG. 15 is a cross-sectional view of a compressive-load-transferring member used in the pipeline shown in FIG. 14.

DESCRIPTION OF THE PREFERRED EMBODIMENT

Figure 1:
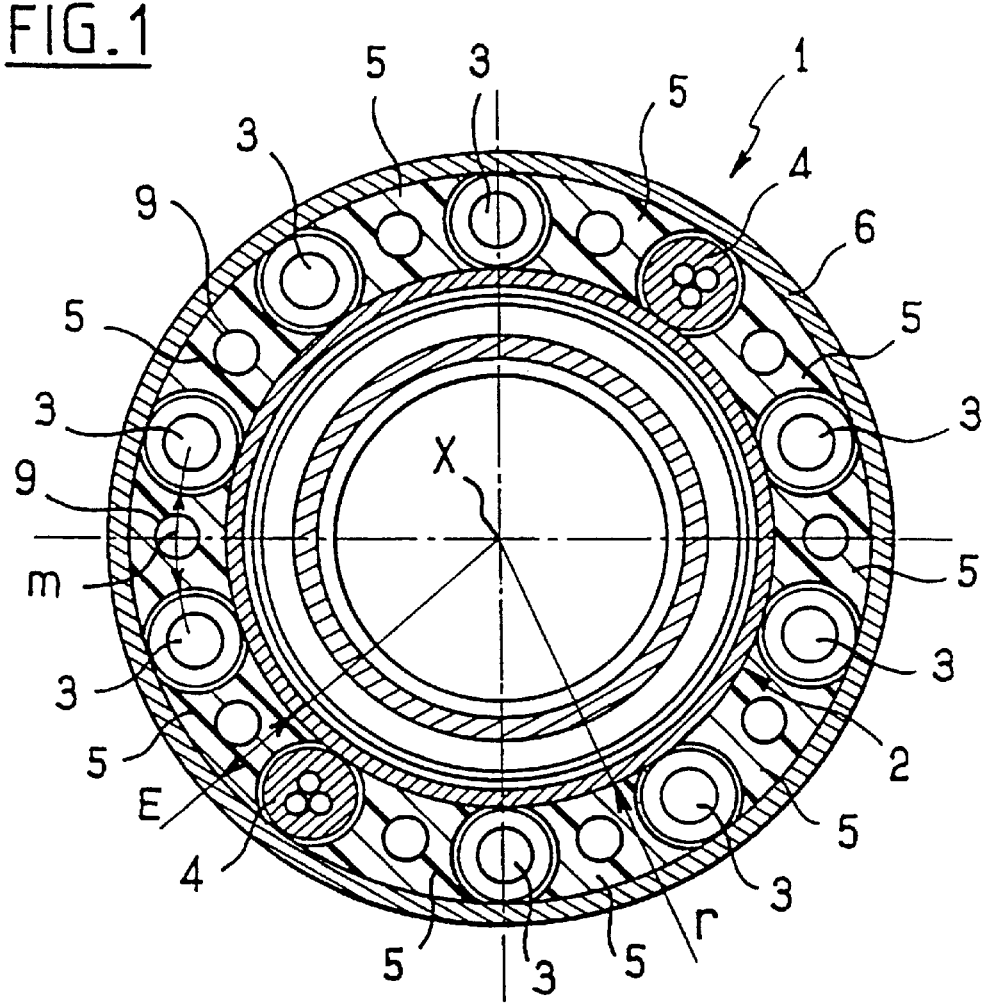
FIG. 1 is a diagrammatic cross-sectional view of a multipipe flexible pipeline according to a first illustrative embodiment of the invention.

FIG. 1 shows, in cross-section and diagrammatically, a flexible pipeline 1 according to a first illustrative embodiment of the invention.

This flexible pipeline 1 comprises a central flexible element consisting of a tubular central pipe 2, with a high tensile strength and a high compressive strength, serving in the embodiment described as a production line, a jacket 6 consisting of a thermoplastic sheath, and a plurality of peripheral pipes 3, of electrical cables 4 and of compressive-load-transferring members 5 which are arranged in a ply in the annular space lying between the jacket 6 and the central pipe 2.

As a variant, the central pipe 2 may serve as a service line and be divided into several smaller pipes, the assembly of which constitutes a central core with a high tensile strength and a high compressive strength.

In the embodiment described, the central pipe 2 is of the type known per se for transporting hydrocarbons and/or gas, and comprises one or more compression-resistant layers, one or more polymeric internal sealing layers having, where appropriate, thermal insulation properties, one or more layers of armouring wires, generally made of metal, wound as a helix in the form of crossed plies which provide the tensile strength, and a polymeric external protective layer. Pipes of this type are manufactured in long lengths by the assignee hereof. Their external diameter is typically greater than 100 mm.

In the embodiment described, the central pipe 2 and the jacket 6 are concentric, each having a circular cross-section.

In the embodiment described with reference to FIG. 1, the peripheral pipes 3 and the electrical cables 4 are angularly distributed about the central axis X of the pipeline 1 and have the same external diameter.

The peripheral pipes 3, numbering eight in the embodiment described, are hydraulic pipes which are sensitive to compression and, to a lesser extent, sensitive to tension.

Their external diameter when not in use is at most equal to the radial dimension E of the annular space lying between the internal surface of the jacket 6 and the external surface of the central pipe 2.

In general, with d denoting the external diameter of the largest peripheral pipe, the radial dimension or thickness E of the annular space then preferably satisfies the relationships:

$d \leq E \leq 3d$ and advantageously $d \leq E \leq 1.5d$.

Figure 3:
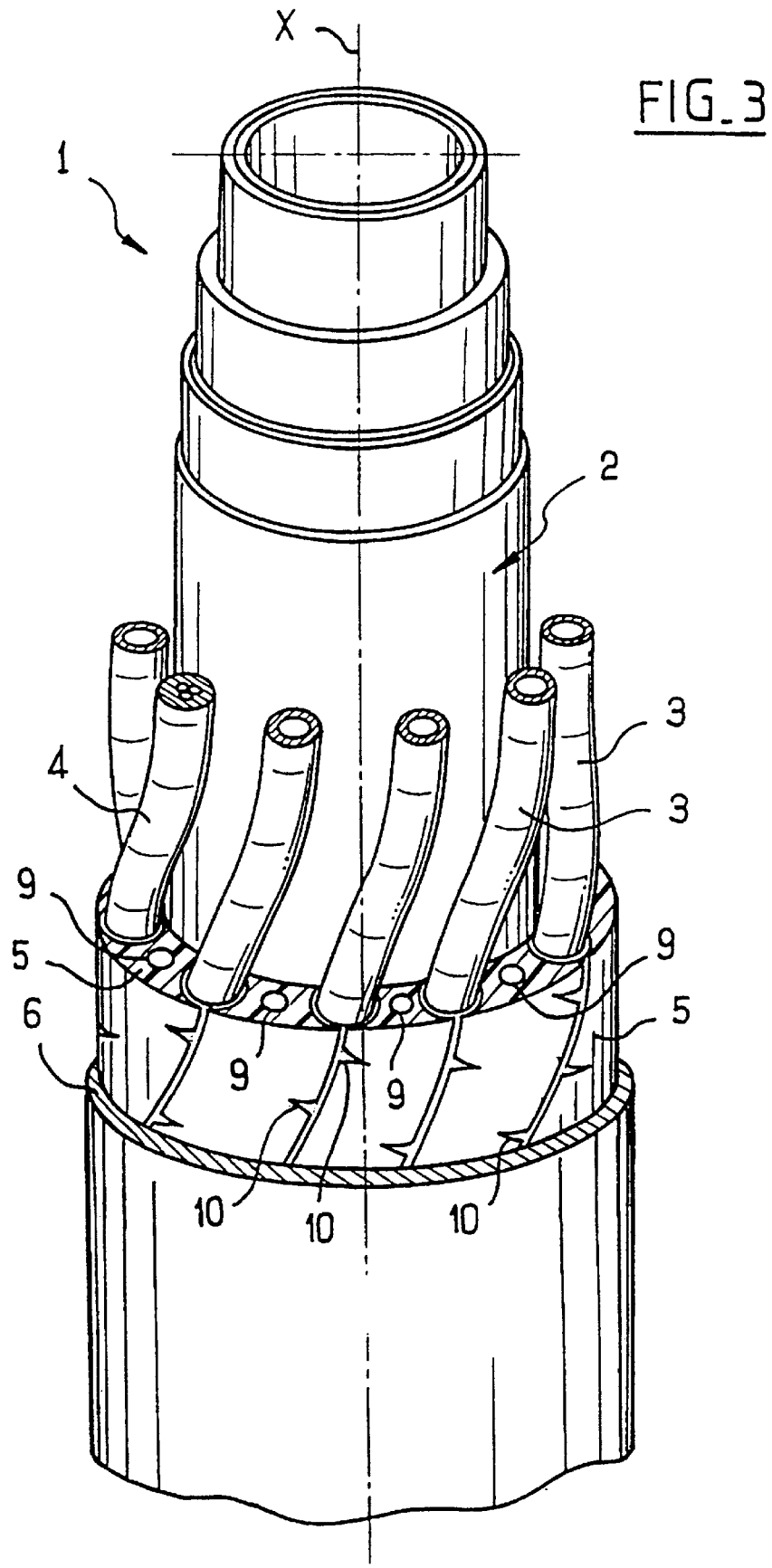
FIG. 3 is a perspective view, with partial cut-away, of the flexible pipeline shown in FIGS. 1 and 2.

As shown in FIG. 3, the peripheral pipes are, in the embodiment described, wound as a helix around the central pipe 2 with a constant helix angle of between 10° and 30°, and preferably equal to 15°.

The flexible compressive-load-transferring members 5 are each arranged as shown in the figures between two peripheral pipes 3 or between a electrical cable 4 and the adjacent peripheral pipe 3.

In the illustrative embodiment described, the flexible compressive-load-transferring members 5 each consist of a profile produced by extruding a plastic having a Shore D hardness greater than or equal to 30 and advantageously greater than or equal to 50.

Figure 2:
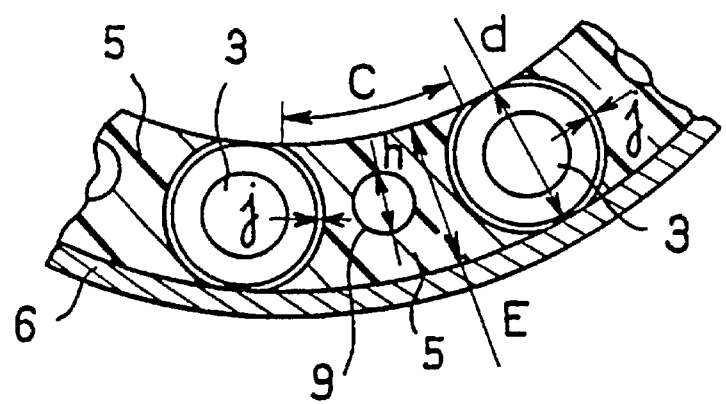
FIG. 2 is a view on a larger scale showing a detail of FIG. 1.

As may be observed by examining FIGS. 1 to 3, each flexible member 5 substantially matches, by means of its radially internal and radially external faces, which are cylinders of revolution about the central axis X, respectively the shape of the outer surface of the central pipe 2 and the shape of the inner surface of the jacket 6. Each flexible member 5 furthermore substantially matches, by means of its lateral faces, the cylindrical axisymmetric shapes of the adjacent peripheral pipes 3 or 4.

The flexible compressive-load-transferring members 5 may be made of high- or low-density polyethylene, of polyamide, of polypropylene, of PVC, of polyurethane, these polymers optionally being reinforced by being filled with fibres such as glass fibres, or of a syntactic foam.

In the illustrative embodiment described and as shown in FIG. 3, the flexible compressive-load-transferring members 5 are provided on their side walls with notches 10 which are advantageously arranged in a staggered fashion and intended to increase the flexural deformability.

When the pipeline 1 is subjected on its external surface to compressive forces directed substantially radially inwards and exerted, for example, by the pads of a caterpillar-track tensioning device, these compressive forces are transferred by the flexible compressive-load-transferring members 5 to the central pipe 2.

Thus, the clamping loads exerted by the pads of the caterpillar-track tensioning device are transferred to the central pipe 2 and the latter supports almost all the tensile loads transferred to the pipeline 1 by the pads of the caterpillar-track tensioning device via the flexible members 5 and the jacket 6.

The central pipe 2 thus takes up most of the tensile loads to which the pipeline 1 is subjected.

Typically, the central pipe takes up at least 75% of the tensile loads exerted on the pipeline 1, or even at least 80 to 90% of the said loads.

Thus, the jacket 6 may advantageously consist of a sheath not having a particularly high tensile strength, for example a sheath made of a polymer such as low-density polyethylene or a polyamide.

Because the tensile loads are taken up by the central pipe 2, the peripheral pipes 3 or 4 are practically not subjected to tensile loads.

In the illustrative embodiment described with reference to FIGS. 1 to 3, the compressive-load-transferring members 5 are internally hollowed out for the sake of saving material, having internal cavities 9 of circular cross-section.

It is preferred to adopt the configuration in which a single flexible member 5, through which an internal cavity 9 runs, is arranged between two adjacent compression- and/or tension-sensitive peripheral pipes when the spacing m of the adjacent peripheral pipes is greater than or equal to the largest diameter d of the latter and less than or equal to twice the thickness E of the annular space lying between the external surface of the central pipe 2 and the internal surface of the jacket 8.

If the spacing m between the said adjacent peripheral pipes is less than or equal to the largest external diameter of the latter, the flexible member 5 then preferably has no internal cavity 9.

If the spacing m of the adjacent peripheral pipes is greater than or equal to twice the thickness E of the said annular space, it is then preferred to place at least two flexible compressive-load-transferring members 5a between the peripheral pipes, as will be described later with reference to FIGS. 4, 5, 10 and 11.

The spacing m between two peripheral pipes is advantageously greater than or equal to 0.7 times the thickness E.

In the embodiment described with reference to FIGS. 1 to 3, the spacing m is approximately equal to E.

Preferably, care is taken to ensure that the circumferential direction dimension c or width of each flexible member 5, measured at mid-thickness of the annular space E, satisfies the relationship:

$1.5 \geq c/E \geq 0.6$.

Advantageously, the distance from the internal cavities 9 to an adjacent peripheral pipe 3 or 4 is greater than 0.3 times and preferably 0.5 times the thickness E and the radial dimension h of the internal cavities 9 is preferably less than 0.8 times the thickness E.

In the illustrative embodiment shown in FIGS. 1 to 3, each flexible compressive-load-transferring member 5 consists of a profile wound as a continuous helix around the central pipe 2 and has lateral faces of circularly arcuate cross-section, these faces being shaped so as substantially to match the shape of the external surface of the adjacent peripheral pipes while leaving an annular gap j between these pipes and faces.

As a variant, the flexible compressive-load-transferring members may be extruded as a single block of material around the compression-and/or tension-sensitive peripheral pipes, the latter having been coated beforehand with a lubricant in order to allow axial sliding between the flexible compressive-load-transferring members 5 and the said peripheral pipes when the pipeline is in flexure, as will be explained later.

The annular gap j allows the compression-and/or tension-sensitive sensitive peripheral pipes to be able to slide axially relative to the adjacent flexible compressive-load-transferring members 5 and thus constitutes a sliding means preventing, when the pipeline 1 is in flexure, the generation of excessive tensile stresses caused by frictional effects between the peripheral pipes and the compressive-load-transferring members 5 in the peripheral-pipe portions lying in that region of the pipeline which is located on the radially external side with respect to the concavity of the curved pipeline 1, and therefore prevents the compression- and/or tension-sensitive peripheral pipes from being damaged.

It is desirable that the gap j between a compression-and/or tension-sensitive peripheral pipe, of external diameter d, and the adjacent load-transferring member 5 satisfy the relationships:

$0.6 \geq j/d \geq 0.03$ and advantageously $0.3 \geq j/d \geq 0.05$.

Of course, it is not outside the scope of the invention to change the number of peripheral pipes present in the annular space between the central pipe 2 and the jacket 6, or the structure of the latter.

In the illustrative embodiment described, the jacket 6 is produced by extruding a plastic.

As a variant, the jacket 6 could be produced by means of a heat-shrinkable plastic tape wound around the peripheral pipes and around the flexible compressive-load-transferring members, or by means of an adhesive tape, care being taken, however, not to disturb the relative sliding between the compression- and/or tension-sensitive peripheral pipes and the flexible compressive-load-transferring members.

The external radius r of the central element 2 is, in the illustrative embodiment described with reference to FIGS. 1 to 3, greater than 50 mm and may be as much as or exceed 100 mm.

The external radius R of the pipeline 1 may be up to three times the radius r of the central flexible element 2.

Figure 4:
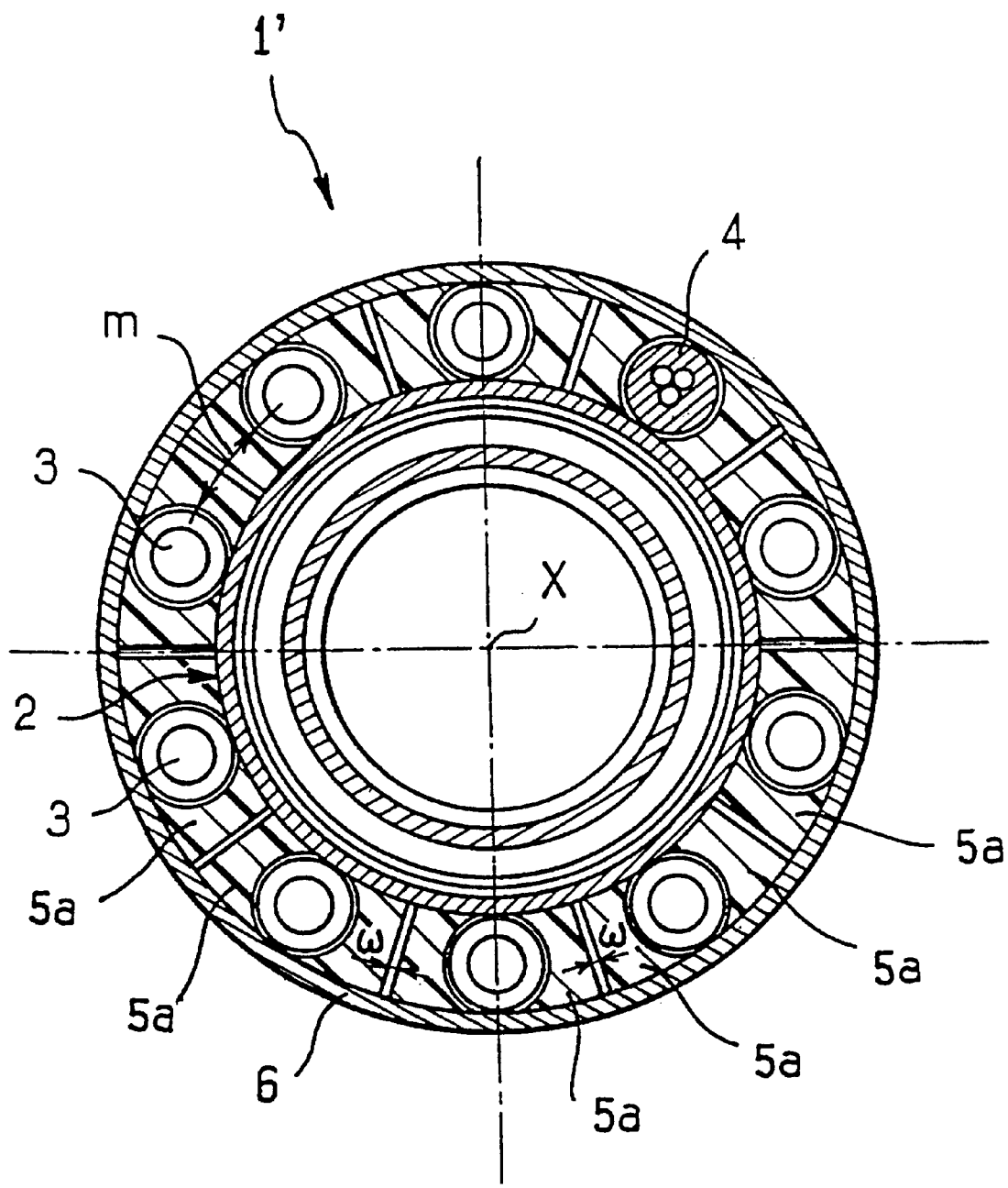
FIG. 4 is a diagrammatic cross-sectional view of a flexible pipeline according to a second illustrative embodiment of the invention.
Figure 5:
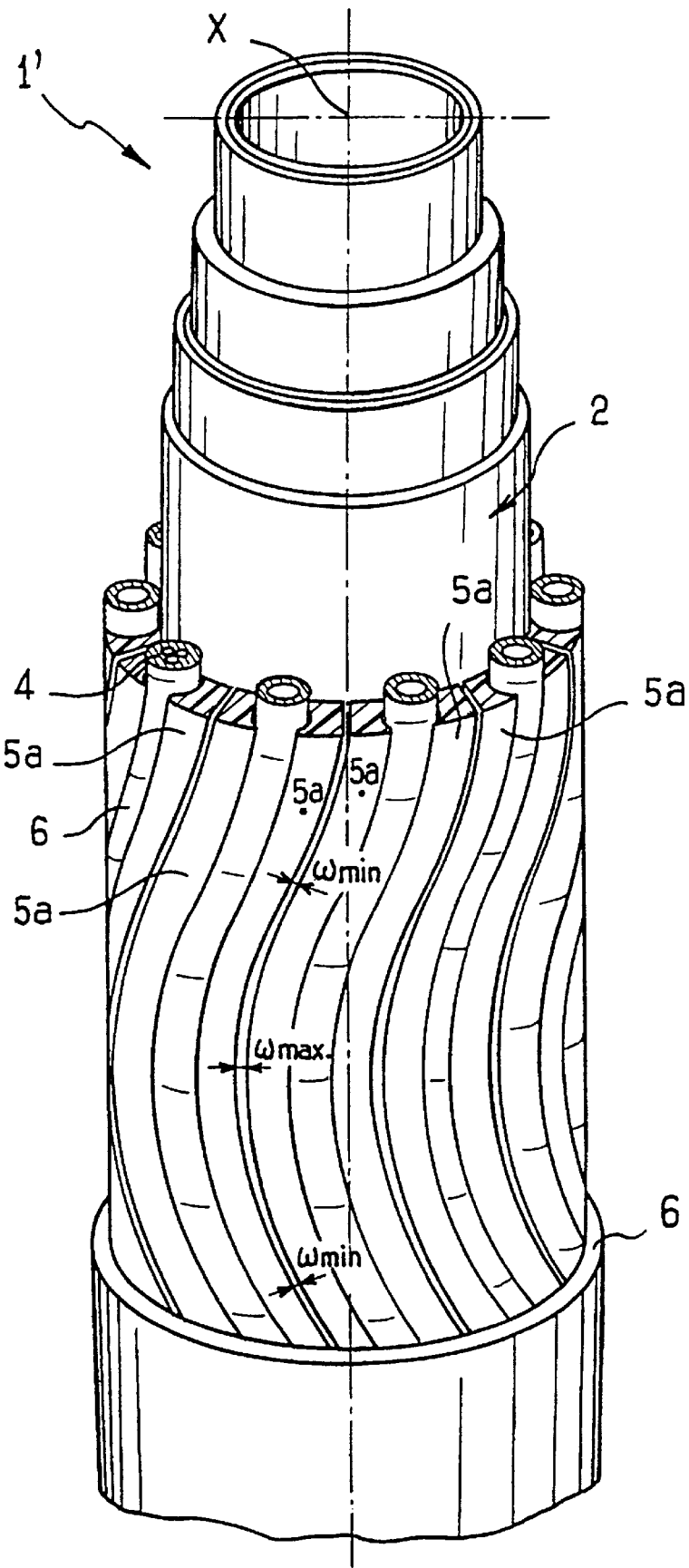
FIG. 5 is a perspective view, with partial cut-away, of the flexible pipeline shown in FIG. 4.

FIGS. 4 and 5 show a multipipe flexible pipeline 1' according to a second illustrative embodiment of the invention. This pipeline 1' differs from the previously described flexible pipeline 1 in particular by the fact that the flexible compressive-load-transferring members are more numerous. This allows the lateral gap to be more evenly distributed in the annular space lying between the central pipe 2 and the internal surface of the jacket 8.

The increase in the number of compressive-load-transferring members is accompanied by a decrease in their width c, hence there is better torsional deformability of each of the flexible compressive-load-transferring members.

In the illustrative embodiment described, two adjacent peripheral pipes 3 are separated by two flexible compressive-load-transferring members 5a, each member leaving a gap j between it and the adjacent peripheral pipe, as described previously, and also leaving a gap w between members.

In the illustrative embodiment shown in FIGS. 4 and 5, the peripheral pipes and the flexible compressive-load-transferring members 5a, the latter consisting of profiles, are wound around the central pipe 2 in helical segments with helix-angle reversal of the "S-Z" type.

FIGS. 6 to 9 show diagrammatically the principle of such a winding.

The "S-Z"-type winding comprises a succession of identical winding repeat units which repeat periodically, each consisting, on the one hand, of helically wound segments with a constant helix angle in the positive sense (A1, B1; A'1, B'1) and of helically wound segments with a constant helix angle in the negative sense (B2, A2; B'2, A'2, not shown) and, on the other hand, of segments in which the winding direction is reversed, providing the gradual variation in the winding angle between the said constant-helix-angle segments (B1, B2; B'1, B'2).

FIGS. 6 and 7 correspond to a winding in which a little less than one revolution is made in one direction and then in the other. More specifically, between the winding-direction-reversal points at axial positions x1 and x2, the winding takes place in one direction over an angular extent equal to 320° and then, between the axial positions x2 and x3, the winding takes place in the opposite direction over the same angular extent.

FIGS. 8 and 9 correspond to a winding in which each peripheral pipe or flexible member 5 is wound through one complete revolution plus 320° in one winding direction between the direction-reversal points at axial positions x'1 and x'2 and then they are wound through one complete revolution plus 320° in the other direction between the points at axial positions x'2 and x'3 (this winding not being illustrated in the figures).

A complete cyclic repeat unit is shown in FIGS. 6 and 7 between the axial positions x1 and x3. In FIGS. 8 and 9, only the first half of a cyclic repeat unit has been shown between the axial positions x'1 and x'2.

The "S-Z"-type winding is advantageous since the machines for producing this are simpler than those used for winding a helix of constant pitch. However, it has the drawback that the lateral gap j is not constant, this being a maximum (jmax) at the points where the winding direction changes (which correspond to the axial positions x2 and x'2 in the embodiments illustrated in FIGS. 6 to 9) and pass through minima (jmin) between these points.

If it is desired to allow relative axial sliding of the peripheral pipes with respect to the flexible compressive-load-transferring members, it is desirable that a minimum gap always be present between the peripheral pipes and the flexible compressive-load-transferring members, whatever the axial position in question on the pipe. Consequently, the minimum gap (jmin) is chosen to be greater than a given value. The inventors have surprisingly found that, despite this choice, the maximum gap (jmax) remained sufficiently small for the compressive-load-transferring members to continue to fulfil their function.

In the illustrative embodiment shown in FIGS. 4 and 5, the winding is in sections of helices of the "S-Z" type. Preferably, the helix angle of the helical segments is alternately equal to +15° and −15°. The angular path of each section of helix lying between two winding-direction-reversal points is preferably equal to (N×360°)−40°±30° and advantageously (N×360°)−40°±15°, N being an integer equal to or greater than 1. This configuration has the advantage of balancing, everywhere, the tensile stresses applied to the peripheral pipes of the pipeline when the latter is in flexure.

As a variant, as was described with reference to FIG. 3, the peripheral pipes may be wound in a helix (of constant helix angle) in the annular space lying between the central pipe and the jacket.

In the mode of helical winding with a constant helix angle, corresponding to the illustrative embodiment shown in FIGS. 1 to 3, or in the "S-Z"-type winding mode, corresponding to the illustrative embodiment shown in FIGS. 4 and 5, it is advantageous to use an adhesive tape wound as a spiral around the peripheral pipes and around the flexible compressive-load-transferring members, to keep the latter in a suitable concentric position with respect to the central pipe 2, and it is advantageous to place a tape, made of a material known for its non-stick properties, such as polytetrafluoroethylene or "TERFANE", between the aforementioned adhesive tape and the peripheral pipes so as to allow the peripheral pipes to undergo relative axial sliding with respect to the flexible compressive-load-transferring members.

When a peripheral pipe, such as a cable 4 for example, has an external diameter d less than the radial dimension E of the annular space between the central pipe 2 and the internal surface of the jacket 6, the cable 4 (or, as a variant, a pipe 3) is preferably placed, as shown in FIG. 10, in a groove 11 which opens out onto a central pipe 2.

In the illustrative embodiment shown in FIG. 10, the groove 11 is formed between two compressive-load-transferring members 5b, leaving a lateral gap v between them and a radial gap p with the cable 4 (or, as a variant, a pipe 3). Preferably, the gap v is less than half the gap p.

As a variant, when a compression-sensitive peripheral pipe 3 (or, as a variant, a cable 4) has an external diameter d less than the radial dimension E of the annular space between the central pipe 2 and the internal surface of the jacket 8, this peripheral pipe 3 (or, as a variant, this cable 4) is, as shown in FIG. 1, advantageously placed in a groove 12 formed in a flexible compressive-load-transferring member 5c, this groove opening out onto the central pipe 2. The groove 12 is shaped so as to house the pipe 3 (or, as a variant, the cable 4) with a gap q.

FIG. 12 shows a flexible pipeline 1″ comprising compression-sensitive peripheral pipes 3a, which are similar to the peripheral pipes 3 of the previous illustrative embodiments, and relatively rigid pipes 3b, for example of the same type as the central pipe 2, or optionally metal tubes or cables. If the pipes 3b are able to transfer the compressive loads, it is not necessary for that region of the annular space lying between a peripheral pipe 3a and a sufficiently close adjacent pipe 3b to be filled with a flexible compressive-load-transferring member 5 as described above, and it may be sufficient, for filling this space, to use a filling material which does not have a particularly high hardness, for example an elastomer material having a Shore D hardness of less than 30, if the centre-to-centre spacing between the pipe 3b and the adjacent peripheral pipe 3a is less than or equal to 1.5 times the external diameter of the peripheral pipe.

FIG. 13 shows a pipeline 1‴ comprising a central pipe 2 serving as a production line, a plurality of peripheral pipes 28 serving as service lines, and two control umbilicals 13 and 14 arranged in the annular space between the jacket and the central pipe 2. The peripheral pipes 28 and the umbilicals 13, 14 are separated by flexible compressive-load-transferring members 5, as described previously.

The jacket comprises an internal plastic sheath 8a, an armouring consisting of two crossed plies of metal wires 8b and an external plastic sheath 8c.

The resistance of a pipe to compressive loads may be characterized by a stiffness, determined by measuring the mass to be applied between two parallel plates gripping one meter of pipe in order to result in a radial deformation equal to 1%. In the case of the central pipe 2, this stiffness is advantageously greater than or equal to 5 t/m/%. The compressive resistance of compression-sensitive pipes may be characterized by a stiffness of less than 0.5 t/m/% and usually of less than 0.2 t/m/%. The stiffness necessary for the pipeline in order to withstand the compressive loads due to the laying and handling means (caterpillar-track tensioning devices, storage reels, chutes or troughs, etc.) is typically greater than 0.5 t/m/l% and usually greater than 1 t/m/%.

FIG. 14 shows a pipeline 1''' in which the jacket 6 consists of a single layer of PA-11 polyamide having a thickness of 5.2 mm. The outside diameter of the peripheral pipes 3, of the "SYNFLEX" type is 16 mm and their inside diameter is 9.5 mm (3/8 inches). Each flexible compressive-load-transferring member 5 is made of "LUPOLEN" high-density polyethylene and has, in cross-section, the shape shown in FIG. 15. The radially internal surface 20 of the flexible member 5 has, in the embodiment described, a radius of curvature equal to 58.9 mm. The radial dimension E is 16.5 mm and the distance between the side walls 21 is 21.5 mm. The distance between the lateral edges of the radially external surface 22 is 37.5 mm. The central pipe 2 is a pipe produced by the assignee hereof, of the "COFLEXIP" type, having an internal diameter equal to 63.5 mm (2.5") and an external diameter equal to 108.9 mm, this pipe withstanding an internal pressure of 6350 psi (438 bar).

By way of indication, the following experimental results were measured on this pipeline, for an applied load of 28.83 t/m:

| Structure tested | Deformation (%) | Stiffness (t/m/%) |
| --- | --- | --- |
| pipeline | 14 | 2.05 |
| "COFLEXIP" central pipe | 0.99 | 29.12 |
| "SYNFLEX" peripheral pipe | 14 | 0.121 |

By virtue of the invention, it is possible to produce a multipipe pipeline having a central pipe with a high tensile strength and a high compressive strength, having a large external diameter, and electrical and/or optical cables wound around this central pipe without these cables breaking when the pipeline is in flexure, despite their distance away from the central axis of the pipeline.

Of course, the invention is not limited to the illustrative embodiments which have just been described.

What is claimed is:

1. A multipipe flexible pipeline comprising:
   a central flexible element having a high tensile strength and a high compressive strength;
   a jacket around and radially spaced outward from the central flexible element defining an annular space between the central flexible element and the jacket;
   a plurality of peripheral pipes arrayed around the central flexible element in at least one ply and passing through the annular space and along the central flexible element; at least one of the peripheral pipes being a first pipe which is sensitive to compression and/or tension;
   at least one flexible compressive-load-transferring member in the annular space adjacent to the at least one first pipe for receiving load applied to the pipeline.

2. The pipeline of claim 1, further comprising sliding means for allowing the at least one first pipe to move relatively with respect to the adjacent flexible compressive-load-transferring member.

3. The pipeline of claim 1, further comprising a gap between the at least one first pipe and the adjacent flexible compressive-load-transferring member for allowing the at least one first pipe to undergo relative axial movement with respect to the adjacent flexible compressive-load-transferring member.

4. The pipeline of claim 3, wherein the gap satisfies the relationship:
   $0.03d \leq$ (gap width) $\leq 0.2d$,
   where d is the external diameter of the at least one first pipe.

5. The pipeline of claim 3, wherein the gap satisfies the relationship:
   $0.1d \leq$ (gap width) $\leq 0.15d$,
   where d is the external diameter of the at least one first pipe.

6. The pipeline of claim 1, wherein the compressive-load-transferring member is a profile extending along the pipeline.

7. The pipeline of claim 1, wherein the peripheral pipes are helically wound around the central flexible element of the pipeline.

8. The pipeline of claim 7, wherein the helix angle of the peripheral pipes is in the range of 10° to 30°.

9. The pipeline of claim 7, wherein the helix angle of the peripheral pipes is 15°.

10. The pipeline of claim 7, wherein the peripheral pipes are wound in "S-Z"-type helical segments.

11. The pipeline of claim 10, wherein the helix angle of the helical segments is in the range between 10° and 30°.

12. The pipeline of claim 10, wherein the helix angle of the helical segments is 15°.

13. The pipeline of claim 1, wherein the compressive-load-transferring member is made of a plastic having a Shore hardness of at least 30.

14. The pipeline of claim 1, wherein the compressive-load-transferring member is made of a plastic having a Shore hardness of at least 50.

15. The pipeline of claim 1, further including at least two circumferentially adjacent ones of the first compression and/or tension sensitive peripheral pipes;
   one of the compressive-load-transferring members being disposed between the two adjacent first pipes, wherein the compressive-load-transferring member has a width dimension in the circumferential direction which is measured at mid-radial thickness of the annular space such that that width satisfies the relationship: width $\geq 0.6$ the radial thickness of the annular space.

16. The pipeline of claim 1, further including at least two circumferentially adjacent ones of the first compression and/or tension sensitive peripheral pipes;
   one of the compressive-load-transferring members being disposed between the two adjacent first pipes, wherein the compressive-load-transferring member has a width dimension in the circumferential direction which is measured at mid-radial thickness of the annular space such that that width satisfies the relationship: width a $\geq 0.8$ the radial thickness of the annular space.

17. The pipeline of claim 1, comprising two circumferentially adjacent ones of the first compression and/or tension sensitive peripheral pipes;
   at least two of the flexible compressive-load-transferring members extending along the pipes, being disposed next to each other around the circumference and between the two first pipes and being shaped and positioned as to define a gap that is between the members and the gap extending along the first pipes.

18. The pipeline of claim 1, comprising two of the flexible compressive-load-transferring members which are circumferentially adjacent and are shaped and placed as to define a gap between the members and the gap extending along the first pipes;

the members are shaped to define a groove at the gap, the groove being shaped for receiving the at least one first pipe in the groove, and the groove being shaped and placed as to open toward the central flexible element.

19. The pipeline of claim 1, wherein the at least one flexible compressive-load-transferring member in the annular space is shaped to define a groove which opens toward the central flexible element, and the groove is sized and shaped for receiving the at least one first pipe therein with a gap between the pipe and the groove.

20. The flexible pipeline of claim 1, wherein the at least one flexible compressive-load-transferring member includes an internal cavity extending along the member along the pipes.

21. The pipeline of claim 1, comprising a plurality of the peripheral pipes, at least one of the compressive-load-transferring members being disposed between circumferentially neighboring ones of the peripheral pipes; and wherein the dimensions of the compressive members and of the annular space satisfy the relationship: 2 times the radial thickness of the annular space $\geq$ width of the compressive-load-transferring member in the circumferential direction $\leq 0.6$ the radial thickness of the annular space.

22. The pipeline of claim 1, comprising a plurality of the peripheral pipes at least one of the compressive-load-transferring members being disposed between circumferentially neighboring ones of the peripheral pipes; and wherein the dimensions of the compressive members and of the annular space satisfy the relationship: 2 times the radial thickness of the annular space $\geq$ width of the compressive-load-transferring member in the circumferential direction $\leq 0.8$ the radial thickness of the annular space.

23. The flexible pipeline of claim 1, wherein the central flexible element is adapted to take up 75% of tensile loads applied to the pipeline.

24. The pipeline of claim 1, wherein the central flexible element is a tubular pipe for transferring gas or liquid.

25. The flexible pipeline of claim 1, wherein the external diameter of the central flexible element is at least 100 mm.

26. The pipeline of claim 1, wherein the central flexible element has a stiffness that is at least 5 t/m %.

* * * * *